(12) United States Patent
Venkatesan et al.

(10) Patent No.: US 10,315,943 B2
(45) Date of Patent: Jun. 11, 2019

(54) METHODS AND SYSTEMS FOR PH TREATMENT AND EXTRACTION OF LEACHABLE RESOURCES AND POLLUTANTS FROM SLUDGE

(71) Applicants: Arjunkrishna Venkatesan, Tempe, AZ (US); Rolf U. Halden, Phoenix, AZ (US)

(72) Inventors: Arjunkrishna Venkatesan, Tempe, AZ (US); Rolf U. Halden, Phoenix, AZ (US)

(73) Assignee: ARIZONA BOARD OF REGENTS ON BEHALF OF ARIZONA STATE UNIVERSITY, Scottsdale, AZ (US)

(*) Notice: Subject to any disclaimer, the term of this patent is extended or adjusted under 35 U.S.C. 154(b) by 341 days.

(21) Appl. No.: 15/093,539

(22) Filed: Apr. 7, 2016

(65) Prior Publication Data

US 2016/0304376 A1    Oct. 20, 2016

Related U.S. Application Data

(60) Provisional application No. 62/150,095, filed on Apr. 20, 2015.

(51) Int. Cl.
| | |
|---|---|
| *C02F 11/00* | (2006.01) |
| *C02F 11/127* | (2019.01) |
| *C02F 11/123* | (2019.01) |
| *C02F 1/66* | (2006.01) |
| *C02F 101/34* | (2006.01) |

(Continued)

(52) U.S. Cl.
CPC .............. *C02F 11/004* (2013.01); *C02F 1/66* (2013.01); *C02F 11/123* (2013.01); *C02F 11/127* (2013.01); *C02F 2101/305* (2013.01); *C02F 2101/306* (2013.01); *C02F 2101/345* (2013.01);

(Continued)

(58) Field of Classification Search
CPC ................ C02F 11/004; C02F 2101/36; C02F 2101/306; C02F 2101/305; C02F 1/66; C02F 11/127; C02F 2101/366; C02F 2101/345; C02F 2301/08; C02F 11/123
See application file for complete search history.

(56) References Cited

U.S. PATENT DOCUMENTS

| | | | | |
|---|---|---|---|---|
| 3,984,312 A | * | 10/1976 | Dulin ................... | B01D 53/507 106/DIG. 1 |
| 4,377,486 A | * | 3/1983 | Barrick ..................... | C02F 1/72 210/609 |

(Continued)

OTHER PUBLICATIONS

Venkatesan AK, Halden RU (2014) Wastewater Treatment Plants as Chemical Observatories to Forecast Ecological and Human Health Risks of Manmade Chemicals. Scientific Reports 4:3731.

(Continued)

*Primary Examiner* — Pamela H Weiss
(74) *Attorney, Agent, or Firm* — George A. Leone; Citadel Patent Law (57) ABSTRACT

A pH treatment and method for extraction of leachable resources and pollutants from sludge. A volume of wastewater sludge is initially dewatered followed by adding pH adjusting agents to the dewatered sludge to remove acid/base-soluble contaminants. The acid/base-soluble contaminants are flushed out or dewatered from the treated product. Treated sludge can then be sent to storage and held for beneficial uses.

5 Claims, 7 Drawing Sheets

(51) Int. Cl.
    *C02F 101/36*         (2006.01)
    *C02F 101/30*         (2006.01)
(52) U.S. Cl.
    CPC .... *C02F 2101/36* (2013.01); *C02F 2101/366* (2013.01); *C02F 2301/08* (2013.01)

(56) References Cited

U.S. PATENT DOCUMENTS

| | | | | | |
|---|---|---|---|---|---|
| 4,431,543 | A | * | 2/1984 | Matsuo | C02F 3/1215 210/605 |
| 5,051,191 | A | * | 9/1991 | Rasmussen | C02F 1/725 210/721 |
| 5,266,210 | A | * | 11/1993 | McLaughlin | C02F 1/5236 210/710 |
| 5,269,939 | A | * | 12/1993 | Laurent | C02F 1/52 210/705 |
| 5,385,673 | A | | 1/1995 | Fergen | |
| 5,417,861 | A | * | 5/1995 | Burnham | C02F 1/66 210/609 |
| 5,422,015 | A | * | 6/1995 | Angell | C02F 11/004 588/257 |
| 5,916,448 | A | * | 6/1999 | Fergen | C02F 11/14 210/723 |
| 6,368,511 | B1 | * | 4/2002 | Weissenberg | C02F 11/06 210/743 |
| 6,398,965 | B1 | * | 6/2002 | Arba | C02F 1/42 210/257.2 |
| 6,855,256 | B2 | * | 2/2005 | Blais | C02F 3/345 210/620 |
| 7,491,333 | B1 | * | 2/2009 | Luke | C02F 1/441 210/638 |
| 2002/0185456 | A1 | * | 12/2002 | Ward | C02F 11/18 210/766 |
| 2014/0116938 | A1 | * | 5/2014 | Theodore | C02F 11/004 210/609 |
| 2016/0355444 | A1 | * | 12/2016 | Olkowski | C08H 6/00 |

OTHER PUBLICATIONS

Venkatesan AK, Halden RU (2014) Loss and in situ production of perfluoroalkyl chemicals in outdoor biosolids—soil mesocosms. Environ Res 132:321-327.

Venkatesan AK, Halden RU (2014) Contribution of Polybrominated Dibenzo-p-dioxins and Dibenzofurans (PBDD/Fs) to the Toxic Equivalency of Dioxin-like Compounds in Archived Biosolids from the US EPA's 2001 National Sewage Sludge Survey. Environ Sci Technol 48(18):10843-10849.

Venkatesan AK, Pycke BF, Halden RU (2014b) Detection and Occurrence of N-Nitrosamines in Archived Biosolids from the Targeted National Sewage Sludge Survey of the US Environmental Protection Agency. Environ Sci Technol 48:5085-5092.

Venkatesan AK, Halden RU (2013) National inventory of perfluoroallcyl substances in archived U.S. biosolids from the 2001 EPA National Sewage Sludge Survey. J Hazard Mater 252-253:413-418.

Venkatesan AK, Halden RU (2016) Modeling the pH-mediated extraction of ionizable organic contaminants to improve the quality of municipal sewage sludge destined for land application. Science of the total environment. Sci Total Environ 550:736-741.

Walters E, McClellan K, Halden RU (2010) Occurrence and loss over three years of 72 pharmaceuticals and personal care products from biosolids-soil mixtures in outdoor mesocosms. Water Res 44:6011-6020.

Wang F, Shih K (2011) Adsorption of perfluorooctanesulfonate (PFOS) and perfluorooctanoate (PFOA) on alumina: Influence of solution pH and cations. Water Res 45:2925-2930.

Wang H, Brown SL, Magesan GN, Slade AH, Quintern M, Clinton PW, Payn TW (2008) Technological options for the management of biosolids. Environmental Science and Pollution Research-International 15:308-317.

Wells EM, Jarrett JM, Lin YH, Caldwell KL, Hibbeln JR, Apelberg BJ, Herbstman J, Halden RU, Witter FR, Goldman LR (2011) Body burdens of mercury, lead, selenium and copper among Baltimore newborns. Environ Res 111:411-417.

Westerhoff P, Lee S, Yang Y, Gordon G, Hristovski K, Halden RU, Herckes P (2015) Characterization, recovery opportunities, and valuation of metals in municipal sludges from U.S. wastewater treatment plants nationwide. Environ Sci technol 49:99479-9488.

World Health Organization (2010) Multidrug and extensively drug-resistant TB (M/XDR-TB): 2010 global report on surveillance and response. http://whqlibdoc.who.int/publications/2010/9789241599191_eng.pdf, Accessed In: 2014.

Wu C, Spongberg AL, Witter JD, Fang M, Czajkowski KP (2010) Uptake of pharmaceutical and personal care products by soybean plants from soils applied with biosolids and irrigated with contaminated water. Environ Sci Technol 44:6157-6161.

Xia K, Hundal LS, Kumar K, Armbrust K, Cox AE, Granato TC (2010) Triclocarban, triclosan, polybrominated diphenyl ethers, and 4-nonylphenol in biosolids and in soil receiving 33-year biosolids application. Environmental Toxicology and Chemistry 29:597-605.

Young TA, Heidler J, Matos-Pérez CR, Sapkota A, Toler T, Gibson KE, Schwab KJ, Halden RU (2008) Ab initio and in situ comparison of caffeine, triclosan, and triclocarban as indicators of sewage-derived microbes in surface waters. Environ Sci Technol 42:3335-3340.

Ziv-El M, Popat SC, Parameswaran P, Kang D, Polasko A, Halden RU, Rittmann BE, Krajmalnik-Brown R (2012) Using electron balances and molecular techniques to assess Trichoroethene-induced shifts to a dechlorinating microbial community. Biotechnol Bioeng 109:2230-2239.

Batt AL, Bruce IB, Aga DS (2006) Evaluating the vulnerability of surface waters to antibiotic contamination from varying wastewater treatment plant discharges. Environmental Pollution 142:295-302.

Chaney RL, Ryan JA, O'Connor GA (1996) Organic contaminants in municipal biosolids: risk assessment, quantitative pathways analysis, and current research priorities. Sci Total Environ 185:187-216.

Chari BP, Halden RU (2012) Validation of mega composite sampling and nationwide mass inventories for 26 previously unmonitored contaminants in archived biosolids from the US National Biosolids Repository. Water Res 46:4814-4824.

Chen H, Gao B, Li H, Ma LQ (2011) Effects of pH and ionic strength on sulfamethoxazole and ciprofloxacin transport in saturated porous media. J Contam Hydrol 126:29-36.

Clarke BO, Smith SR (2011) Review of 'emerging' organic contaminants in biosolids and assessment of international research priorities for the agricultural use of biosolids. Environ Int 37:226-247.

Code of Federal Regulations, 1995. Code of Federal Regulations 40: Part 136, Appendix B, U.S. GPO, Washington, District of Columbia. http://www.epa.gov/region9/qa/pdfs/40cfr136_03.pdf Accessed in: 2014.

Done HY, Halden RU (2014) Reconnaissance of 47 Antibiotics and Associated Microbial Risks in Seafood Sold in the United States. J Hazard Mater, 282:10-17.

Dowd SE, Gerba CP, Pepper IL, Pillai SD (2000) Bioaerosol transport modeling and risk assessment in relation to biosolid placement. J Environ Qual 29:343-348.

Edwards M, Topp E, Metcalfe C, Li H, Gottschall N, Bolton P, Cumoe W, Payne M, Beck A, Kleywegt S (2009) Pharmaceutical and personal care products in tile drainage following surface spreading and injection of dewatered municipal biosolids to an agricultural field. Sci Total Environ 407:4220-4230.

Gerba C, Pepper I, Whitehead L (2002) A risk assessment of emerging pathogens of concern in the land application of biosolids. Water Sci Technol 46:225-230.

Gray EP, Bruton TA, Higgins CP, Halden RU, Westerhoff P, Ranville JF (2012) Analysis of gold nanoparticle mixtures: a comparison of hydrodynamic chromatography (HDC) and asymmetrical flow field-flow fractionation (AF4) coupled to ICP-MS. J Anal at Spectrom 27:1532-1539.

Halden RU, Paull DH (2004) Analysis of triclocarban in aquatic samples by liquid chromatography electrospray ionization mass spectrometry. Environ Sci Technol 38:4849-4855.

(56) References Cited

OTHER PUBLICATIONS

Halden RU, Paull DH (2005) Co-occurrence of triclocarban and triclosan in U. S. water resources. Environ Sci Technol 39:1420-1426.
Halden RU, Dwyer DF (1997) Biodegradation of dioxin-related compounds: a review. Bioremediation J 1:11-25.
Hari AC, Paruchuri RA, Sabatini DA, Kibbey TC (2005) Effects of pH and cationic and nonionic surfactants on the adsorption of pharmaceuticals to a natural aquifer material. Environ Sci Technol 39:2592-2598.
Heidler J, Halden RU (2007) Mass balance assessment of triclosan removal during conventional sewage treatment. Chemosphere 66:362-369.
Heidler J, Sapkota A, Halden RU (2006) Partitioning, persistence, and accumulation in digested sludge of the topical antiseptic triclocarban during wastewater treatment. Environ Sci Technol 40:3634-3639.
Hong P, Al-Jassim N, Ansari MI, Mackie RI (2013) Environmental and public health implications of water reuse: antibiotics, antibiotic resistant bacteria, and antibiotic resistance genes. Antibiotics 2:367-399.
Johnson RL, Anschutz AJ, Smolen JM, Simcik MF, Penn RL (2007) The adsorption of perfluorooctane sulfonate onto sand, clay, and iron oxide surfaces. Journal of Chemical & Engineering Data 52:1165-1170.
Kummerer K (2003) Significance of antibiotics in the environment. J Antimicrob Chemother 52:5-7.
La Guardia MJ, Hale RC, Harvey E, Mainor TM (2001) Alkylphenol ethoxylate degradation products in land-applied sewage sludge (biosolids). Environ Sci Technol 35:4798-4804.
Lapworth D, Baran N, Stuart M, Ward R (2012) Emerging organic contaminants in groundwater: a review of sources, fate and occurrence. Environmental pollution 163:287-303.
Lindstrom AB, Strynar MJ, Delinsky AD, Nakayama SF, McMillan L, Libelo EL, Neill M, Thomas L (2011) Application of WWTP Biosolids and Resulting Perfluorinated Compound Contamination of Surface and Well Water in Decatur, Alabama, USA. Environ Sci Technol 45(19):8015-8021.
Love DC, Halden RU, Davis MF, Nachman, KE (2012). Feather meal: A previously unrecognized route for reentry into the food supply of multiple pharmaceuticals and personal care products (PPCPs). Environ Sci Technol 46(7):3795-3802.
Lundin M, Olofsson M, Pettersson G, Zetterlund H (2004) Environmental and economic assessment of sewage sludge handling options. Resour Conserv Recycling 41:255-278.
Martins da Costa P, Vaz-Pires P, Bernardo F (2006) Antimicrobial resistance in *Enterococcus* spp. isolated in inflow, effluent and sludge from municipal sewage water treatment plants. Water Res 40:1735-1740.
McClellan K, Halden RU (2010) Pharmaceuticals and personal care products in archived US biosolids from the 2001 EPA national sewage sludge survey. Water Res 44:658-668.
McClellan K, Kalinowski T, Bruton TA, Roll IB, Halden RU (2011) In Situ Microcosm Array (ISMA) vs. Standard Laboratory Assessment of Candidate Remediation Technologies—A Perchlorate Case Study. Geological Society of America Annual Meeting & Exhibition, Minneapolis, MN. 2011.
Miller TR, Heidler J, Chillrud SN, DeLaquil A, Ritchie JC, Mihalic JN, Bopp R, Halden RU (2008) Fate of triclosan and evidence for reductive dechlorination of triclocarban in estuarine sediments. Environ Sci Technol 42:4570-4576.
National Research Council (US). Committee on Toxicants, Pathogens in Biosolids Applied to Land (2002) Biosolids applied to land: Advancing standards and practices. Natl Academy Pr. http://water.epa.gov/scitech/wastetech/biosolids/upload/complete.pdf, Accessed in: 2014.

Nikolaidis NP, Chheda P (2001) Heavy metal mobility in biosolids-amended glaciated soils. Water Environ Res 73:80-86.
North East Biosolids and Residuals Association (NEBRA) (2007) a national biosolids regulation, quality, end use & disposal survey. Tamworth, NH. http://www.nebiosolids.org/uploads/pdf/NtlBiosolidsReport-20July07.pdf, Accessed in: 2014.
O'Kelly BC (2005) Mechanical properties of dewatered sewage sludge. Waste Manage 25:47-52.
Overcash M, Sims RC, Sims JL, Nieman JKC (2005) Beneficial Reuse and Sustainability. J Environ Qual 34:29-41.
Pruden A (2013) Balancing water sustainability and public health goals in the face of growing concerns about antibiotic resistance. Environ Sci Technol 48:5-14.
Reinthaler F, Posch J, Feierl G, Wüst G, Haas D, Ruckenbauer G, Mascher F, Marth E (2003) Antibiotic resistance of *E. coli* in sewage and sludge. Water Res 37:1685-1690.
Rulkens W (2007) Sewage sludge as a biomass resource for the production of energy: overview and assessment of the various options†. Energy Fuels 22:9-15.
Sapkota A, Heidler J, Halden RU (2007) Detection of triclocarban and two co-contaminating chlorocarbanilides in US aquatic environments using isotope dilution liquid chromatography tandem mass spectrometry. Environ Res 103:21-29.
Sepulvado JG, Blaine AC, Hundal LS, Higgins CP (2011) Occurrence and fate of perfluorochemicals in soil following the land application of municipal biosolids. Environ Sci Technol 45(19):8106-8112.
Stylianou MA, Kollia D, Haralambous K, Inglezakis VJ, Moustakas KG, Loizidou MD (2007) Effect of acid treatment on the removal of heavy metals from sewage sludge. Desalination 215:73-81.
Suh Y, Rousseaux P (2002) An LCA of alternative wastewater sludge treatment scenarios. Resour Conserv Recycling 35:191-200.
Tackett SL, Winters ER, Puz MJ (1986) Leaching of heavy metals from composted sewage sludge as a function of pH. Can J Soil Sci 66:763-765.
Ter Laak TL, Gebbink WA (2006) Estimation of soil sorption coefficients of veterinary pharmaceuticals from soil properties. Environ toxicol chem 25:933-941.
Thiele-Bruhn S (2003) Pharmaceutical antibiotic compounds in soils—a review. Journal of Plant Nutrition and Soil Science 166:145-167.
Topp E, Monteiro SC, Beck A, Coelho BB, Boxall A, Duenk PW, Kleywegt S, Lapen DR, Payne M, Sabourin L (2008) Runoff of pharmaceuticals and personal care products following application of biosolids to an agricultural field. Sci Total Environ 396:52-59.
U. S. Environmental Protection Agency (1979) Process Design Manual for Sludge Treatment and Disposal. http://yosemite.epa.gov/water/owrccatalog.nsf/9da204a4b4406ef885256ae0007a79c7/473dfe35407b6aa585256b06007248af!OpenDocument. Accessed in: 2014.
U. S. Environmental Protection Agency (1996) Clean Water Needs Survey; USEPA: Washington, DC.
U.S. Environmental Protection Agency (Jan. 2009) Targeted National Sewage Sludge Survey Overview Report. http://water.epa.gov/scitech/wastetech/biosolids/tnsss-overview.cfm. Accessed in: 2014.
Venkatesan AK, Pycke BFG, Barber LB, Lee KE, Halden RU (2012) Occurrence of triclosan, triclocarban, and its lesser chlorinated congeners in Minnesota freshwater sediments collected near wastewater treatment plants. J Hazard Mater 229:29-35.
Venkatesan AK, Done HY, Halden RU (2015) United States National Sewage Sludge Repository at Arizona State University—a new resource and research tool for environmental scientists, engineers, and epidemiologists. Environmental Science and Pollution Research 22(3):1577-1586.

\* cited by examiner

METHODS AND SYSTEMS FOR PH TREATMENT AND EXTRACTION OF LEACHABLE RESOURCES AND POLLUTANTS FROM SLUDGE

RELATED APPLICATION

This application claims priority from U.S. provisional application No. 62/150,095 of Venkatesan and Halden, filed Apr. 20, 2015, entitled "Methods and Systems for pH Treatment and Extraction of Leachable Resources and Pollutants from Sludge," which is hereby incorporated by reference.

TECHNICAL FIELD

The present invention relates to methods and systems for pH treatment and extraction of leachable resources and pollutants from sludge.

BACKGROUND

Continuing growth of the U.S. population is creating an increased demand for wastewater treatment capacity. Consequently, the amount of municipal sewage sludge (MSS) produced will increase in the foreseeable future. In 2004, the U.S. Environmental Protection Agency (U.S. EPA) estimated that approximately 6.5 million tonnes of MSS are produced each year in the U.S. (NEBRA 2007).

Figure 1:
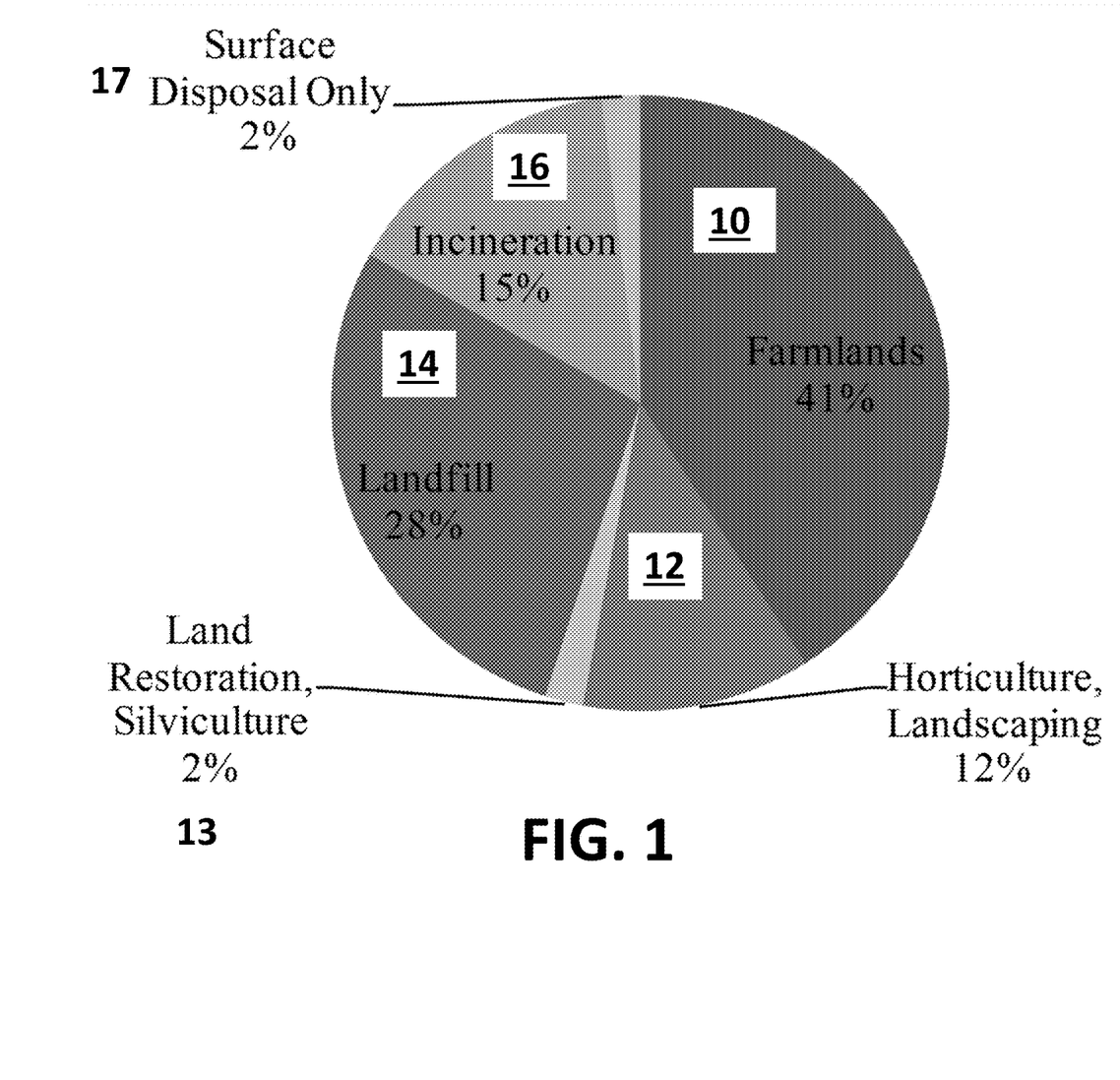
FIG. 1 graphically illustrates municipal sewage sludge uses and disposal modes in the United States for the year 2004 by category and magnitude shown in percent (Data extracted from NEBRA, 2007).

FIG. 1 shows the different categories and magnitudes of U.S. MSS uses. A first area 10 (farmlands), a second area 12 (horticulture and landscaping) and a third area 13 (land restoration silviculture) represent beneficial land applications. A fourth area 14 (landfill), a fifth area 16 (incineration) and a sixth area 17 (surface disposal only) represent disposal options. As shown, 55% of MSS is estimated to be applied on land for beneficial purposes, totaling approximately 3.6 million tonnes of MSS each year. Treated MSS fit for land application (also termed biosolids) is rich in organic carbon content and nutrients that can improve soil properties, crop productivity and fertility (Smith 1995, Wang et al. 2008). A Life Cycle Assessment (LCA) performed on different treatment and disposal scenario of MSS showed that the combination of anaerobic digestion and agricultural land application was the most viable option creating lower costs and consuming less energy compared to other treatment and disposal options (Suh and Rousseaux 2002). Landfilling of MSS is becoming difficult due to limited land availability, increased compliance costs, and concerns regarding leachate and greenhouse gas emissions from methane production (Wang et al. 2008). Incineration of MSS, on the other hand, involves high operational costs and concerns over toxic flue gas emissions (Lundin et al. 2004). Recent efforts in using MSS as a resource for energy production and nutrient recovery have increased the beneficial value of MSS (Rulkens 2007, Wang et al. 2008). Beneficial reuse of MSS already is applied to over half of the total U.S. MSS mass and this trend is expected to increase further in the foreseeable future.

However, a notable downside to the beneficial reuse of MSS is the presence of persistent (P), bioaccumulative (B), and toxic (T) chemicals, toxic metals and pathogens in MSS, all known to pose significant environmental and human health concerns (Chaney et al. 1996, Dowd et al. 2000, Gerba et al. 2002, National Research Council 2002).

The number of hazardous chemicals detected in MSS is considerable and constantly increasing (U.S. EPA 2009, Venkatesan et al. 2015, Venkatesan and Halden 2014a,b,c). Currently, the U.S. EPA has established standards for nine toxic compounds in land-applied MSS, all belonging to the inorganic group of metals, including As, Cd, Cu, Hg, Mo, Ni, Pb, Se, and Zn (40 CFR Part 503 of US Federal Regulations). The Part 503 regulation focuses on the presence of (a) nine metals, (b) microbial pathogens, and (c) MSS unwanted attraction to disease vectors as a basis for determining MSS quality.

Furthermore, in addition to the aforementioned concerns, the presence of significant quantities of organic contaminants of emerging concern (CECs) poses a newly recognized threat to the practice of land application of MSS (Chaney et al. 1996, Clarke and Smith 2011, Topp et al. 2008, Venkatesan et al. 2015). Many of these contaminants are known endocrine disruptors, carcinogens and potent toxicants to aquatic organisms. In addition, an emerging concern is the presence of significant quantities of important antibiotics in MSS (e.g. ciprofloxacin) that is known to promote antibiotic resistance in human pathogens even when present at non-therapeutic concentrations (Martins da Costa et al. 2006, Pruden 2013, and Reinthaler et al. 2003).

Prior screening by Arizona State University (ASU) for 239 contaminants in nationally representative samples of MSS collected from more than 160 U.S. wastewater treatment plants (WWTPs), showed the presence of 130 CECs in MSS (Venkatesan et al. 2015, Venkatesan et al. 2014a, 2014b). These included pharmaceuticals and personal care products (PPCPs), brominated flame retardants (BFRs), perfluorinated chemicals (PFCs), 4-nonylphenol and its ethoxylates (NP and NPEOs), as well as hormones, polybrominated dioxins and furans (PBDD/Fs), and nitrosamines. Chemicals detected were calculated to contribute about 0.04-0.15% of the total dry mass of MSS produced in the U.S. annually, a mass equivalent to 0.4-1.5 g/kg of dry sludge or about 4,700 tonnes (range: 2,600-7,900 tonnes) of chemicals annually. However, this estimate is conservative with respect to mass (i.e., lower than the true value), since other industrial organic chemicals known to occur in MSS (e.g., linear alkylbenzene sulfonates, PCBs, etc.) were not included in the screening. The lack of transformation of these contaminants during optimized biological wastewater treatment and sludge treatment processes (e.g., activated sludge treatment followed by anaerobic digestion), indicate a strong persistence and resistance to biotransformation of these compounds upon release into the environment (Venkatesan and Halden 2014a).

Another important concern is leaching of contaminants from land applied MSS. Recent studies have shown contamination of groundwater, surface water, and uptake of CECs by agricultural crops from soils amended with MSS (Clarke and Smith 2011, Lapworth et al. 2012, Sepulvado et al. 2011, Wu et al. 2010, Xia et al. 2010). NP and NPEOs, PFCs and PPCPs have been shown to leach from MSS at significant concentrations (Edwards et al. 2009, La Guardia et al. 2001, Lindstrom et al. 2011, and Sepulvado et al. 2011). PFC concentrations in well water and surface water resulting from contaminant leaching from nearby fields amended with MSS were shown to be in excess of U.S. EPA's health advisory level for drinking water (Lindstrom et al. 2011). This brings up two important questions addressed by the inventors in the solution presented herein: First, what fraction of the estimated contaminant load of 4,700 tonnes can readily leach from land-applied MSS to contaminate our water resources? And, secondly, is there a straightforward technology that can remove this leachable fraction of the contaminant mass from MSS prior to disposal on land? Current safety assessments of land-applied MSS are incomplete, as this information is not available. The methods and systems presented herein address this knowledge gap and introduce a straightforward process for removing the leachable fraction of contaminants from MSS to prevent adverse environmental and human health effects upon MSS recycling on land.

The present invention provides novel solutions for the deficiencies inherent in methods like those described above.

BRIEF SUMMARY OF THE DISCLOSURE

This summary is provided to introduce, in a simplified form, a selection of concepts that are further described below in the Detailed Description. This summary is not intended to identify key features of the claimed subject matter, nor is it intended to be used as an aid in determining the scope of the claimed subject matter.

A pH treatment and extraction of leachable resources and pollutants from sludge is provided. A volume of wastewater sludge is initially dewatered followed by adding pH adjusting agents to the dewatered sludge to remove acid/base-soluble contaminants. The acid/base-soluble contaminants are flushed out or dewatered from the treated product. Treated sludge can then be sent to storage and held for beneficial uses.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE PREFERRED EMBODIMENTS

The following disclosure describes systems and methods for treatment of a volume of wastewater sludge. Several features of methods and systems in accordance with example embodiments are set forth and described in the Figures. It will be appreciated that methods and systems in accordance with other example embodiments can include additional procedures or features different than those shown in the Figures. Example embodiments are described herein with respect to a method for pH treatment and extraction of leachable resources and pollutants from sludge. However, it will be understood that these examples are for the purpose of illustrating the principles, and that the invention is not so limited. Additionally, methods and systems in accordance with several example embodiments may not include all of the features shown in the Figures.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example" or "an example embodiment," "one embodiment," "an embodiment" or combinations and/or variations of these terms means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Definitions

Generally, as used herein, the following terms have the following meanings when used within the context of wastewater sludge treatment:

A "sample" as used herein refers to material, such as environmental material obtained from a remediation site that is suspected of containing, or known to contain, contaminants of concern.

"Contaminants" include chemicals and other compounds hazardous to human health, such as pharmaceuticals and other chemicals of concern.

Contaminants of Concern in Sewage Sludge

Among 429 organic chemicals screened for in U.S. MSS samples, 312 or 73% of the chemicals were detected. The sum of average concentration of 312 chemicals was 727 (sum of minimum: 412; sum of maximum: 1235) mg/kg dry weight (dw) of sludge (Venkatesan and Halden 2016).

Figures 2A, 2B, 2C:
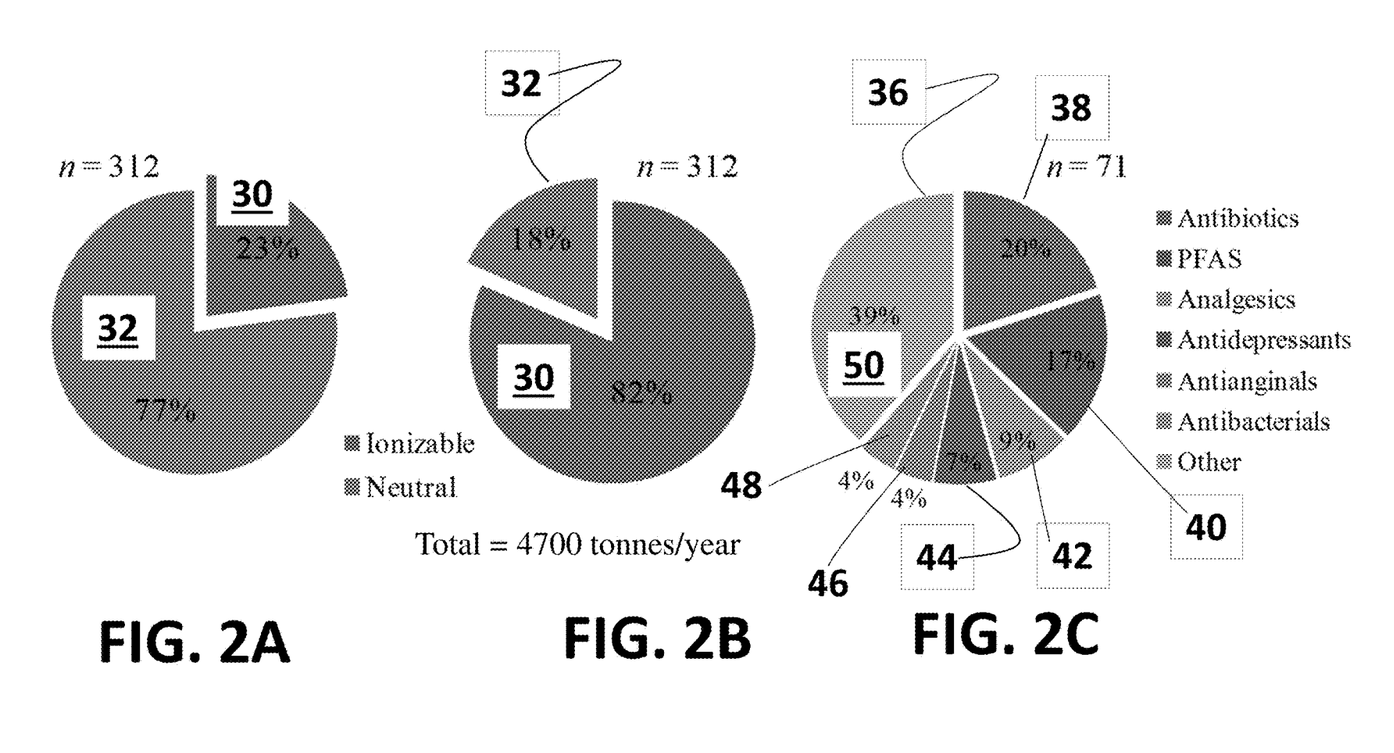
FIG. 2A-FIG. 2B graphically illustrate comparisons of ionic and neutral contaminants detected in nationally representative U.S. municipal sewage sludge samples by number (FIG. 2A) and by mass (FIG. 2B). Total value (4700 tonnes/year) represents the estimated amount of CEC mass accumulating in MSS each year.
FIG. 2C graphically represents the breakdown of the number of ionic contaminants detected in MSS by type.

Referring now specifically to FIG. 2A-FIG. 2C, comparisons of ionic and neutral contaminants detected in nationally representative U.S. municipal sewage sludge samples by number (FIG. 2A) and by mass (FIG. 2B) are graphically shown where n represents the number of chemical compounds. FIG. 2C represents the breakdown of the number of ionic contaminants detected in MSS by type (Venkatesan and Halden, 2016).

Out of the 312 contaminants, only 71 (23%) chemicals were identified as ionizable (FIG. 2A). Interestingly, these chemicals made up 82% of the total mass of chemicals sequestered in U.S. MSS [594 (range: 440 to 945) mg/kg dw] (FIG. 2B). Detected ionizable compounds included 57 PPCPs, 12 PFCs, one surfactant and one pesticide, and the annual load of IOCs in U.S. MSS are estimated to exceed 3800 t annually.

Referring jointly to FIG. 2A and FIG. 2B, seventy-one compounds 30 (23%) were ionizable compounds, contributing 82% (3850 tonnes) to the total contaminant mass in MSS. The remaining 77% were neutral compounds 32. As specifically shown in FIG. 2B, the neutral compounds contributed 18% (850 tonnes) to the total contaminant mass in MSS, annually.

Of this quantity, 55% is land-applied which means more than 2000 t of ionizable compounds per year is applied on U.S. soils. Considering a typical average biosolids land application rate of 16.8 t/ha (7.5+2.5 dry U.S. tons per acre), this value translates to about 10 (range: 7.4 to 16) kg of IOCs applied per hectare of agricultural land. A breakdown of important class of chemicals falling into this category shows that antibiotics alone represent 20% of total IOCs by number (FIG. 2C).

Referring now specifically to FIG. 2C, identified ionizable compounds included 57 PPCPs, 12 PFCs and the surfactant nonylphenol. More specifically identified are antibiotics 38 representing 20%, PFAS 40 representing 17%, analgesics 42 representing 9%, antidepressants 44 representing 7%, antianginals 46 representing 4%, antibacterials 48 representing 4% and other compounds 50 representing 39% of the total identified ionizable compounds.

One of the factors that influence water solubility and mobility (leachability) of organic contaminants from MSS is the pH of the environment. This is especially the case for ionizable contaminants that are prone to leach out of MSS under acidic or basic pH conditions, depending on the compounds' physical-chemical properties (e.g., ionization constants). The sorption behavior of neutral compounds on the other hand is constant, irrespective of pH. Hence, adjusting the pH of MSS has the potential to mobilize these ionizable organic contaminants (IOCs) that can then be extracted by flushing and removed prior to land application.

Adjustment of sludge pH to a value of greater than 12 via lime addition is a common process for sludge stabilization and has been employed in WWTPs for more than four decades (U. S. EPA 1979). However, this treatment is currently focused only on a reduction of the pathogen content of MSS. The secondary, major benefit of mobilizing IOCs during lime stabilization has not yet been evaluated and utilized to date and, as practiced today, the lack of sludge flushing after lime treatment prevents successful removal of pollutants prior to MSS release to the environment. Moreover, certain IOCs require an acidic pH to get mobilized; a process that is not commonly used for sludge stabilization. In contrast to known methods, the method described herein below will reduce the leachable fraction of IOCs in MSS by pH adjustment and extraction prior to land application of MSS.

Important additional benefits of pH adjustment are (i) increased mobility of toxic metals at low pH that could be extracted along with certain IOCs, and (ii) decreased pathogen content of MSS due to acidic or basic stabilization. Also, a combination of acidic followed by basic treatment will produce high amount of heat from exothermic reaction or heat of hydration, that can cause thermal inactivation of pathogens (See U.S. Pat. No. 5,385,673 which is incorporated by reference). Both metals and pathogens are currently regulated in MSS by the U.S. EPA and thus the proposed project has the potential to further reduce the burden of toxic metals and pathogens in sludge to produce MSS of exceptional quality, as defined in 40 CFR Part 503. The beneficial value of MSS currently is diminished by the presence of significant amounts of contaminants. Yet, in sustainability terms, land application of MSS is both cost-effective and prudent to return scarce nutrients like phosphorus back to agricultural soils. Hence, the disclosed method will make land application a more sustainable and safer practice, and provide a cost-effective and straightforward treatment process that can be implemented easily in existing sludge treatment systems in U.S. WWTPs and worldwide, to significantly improve the quality of MSS destined for land application. Thereby, precious soil and water resources are protected from unnecessary contamination.

Hypothetical Examples

A modified mathematical model using the chemical sorption equation was used to estimate the fraction of IOCs that can be potentially desorbed from MSS by the proposed pH treatment system (Venkatesan and Halden 2016). In order to account for feasibility of the process, only IOCs featuring a $pK_a$ value within 3 and 10 were considered for this model. The fraction of IOCs sorbed onto MSS ($f_s$) was modeled for any given value of pH-adjusted distribution coefficient (D) using the following modified sorption equation from Fjeld et al. 2007:

$$f_s = \frac{D \rho s_f}{1 + D \rho s_f} \quad \text{Eq. 1}$$

Where $\rho$ is the density of MSS, $s_f$ is the solids fraction of sludge (the product of $\rho$ and $s_f$ being the MSS solids concentration) and assuming that the contaminants partition onto the total (organic and inorganic) solids fraction. A typical value of $\rho$=1.55 g/cm3 was used for digested MSS (O'Kelly 2005). A typical value of 10% of solids ($s_f$=0.1) in treated MSS for disposal was used for the model. In the case of chemicals with multiple $pK_a$ values, only values within 3 and 10 were considered for modeling purposes. Average pH of MSS can vary between 6 and 8 depending on the type of sludge processing technique (e.g. lime treated sludge can have pH >9). A typical pH of 7.5 was used as the reference pH of MSS to estimate the relative amount of sorption/desorption of contaminants as a function of sludge pH change.

Out of the 71 detected IOCs, 52 chemicals had at least one of their $pK_a$ value within the range of 3 to 10 and their sorption behavior was modeled using equation 1. The relative fraction sorbed is defined here as the amount of chemical sorbed on to the sludge at a given pH relative to the initial amount sorbed to the sludge at ambient pH value (in this case pH of 7.5). As shown in FIG. 3B and FIG. 3C, the sorption of acids decreases and of bases increases with increasing pH. The sorption behavior is complex for chemicals with multiple $pK_a$ values, and in general peaks in the neutral pH range (7), and drops with increasing acidic or basic pH conditions.

This model was applied to find that between 36 and 85% of the mass of individual classes of IOCs potentially can be desorbed due to ionization forced by adjustment of the typical pH value of 7.5 in MSS. However, this model accounts only for hydrophobic sorption of contaminants and does not include other mechanisms like electrostatic attraction that explains sorption behavior of many ionized compounds (e.g., PFCs and antibiotics). An overall desorption of 30% of IOCs by mass at acidic pH (<3) and 31% of IOCs at alkaline pH (>12) could be achieved by pH adjustment. A combination of acidic and basic pH treatment could result in desorption of >40% of IOC mass detected in MSS. This estimate is conservative, as it considers only IOCs with $pK_a$ values between 3 and 10; whereas IOCs featuring a very low $pK_a$ value and those that electrostatically sorb onto solids also potentially can desorb following pH adjustment, as demonstrated for pharmaceuticals and PFCs (Chen et al. 2011, Wang and Shih 2011).

Figure 3A:
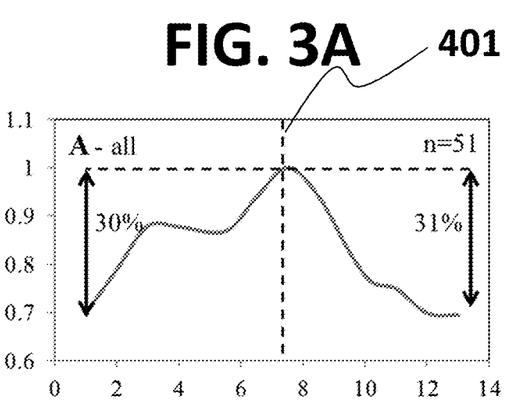
FIG. 3A-FIG. 3D show modeling of relative fraction of IOCs associated with the solids content of MSS as a function of pH.
Figure 3B:
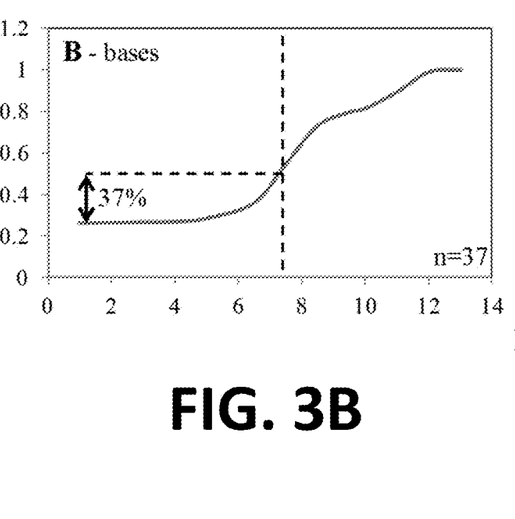
Figure 3C:
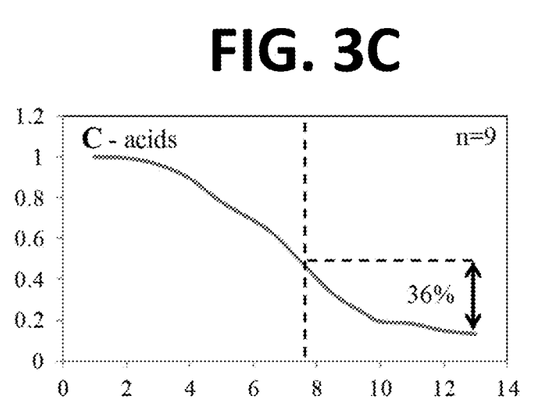
Figure 3D:
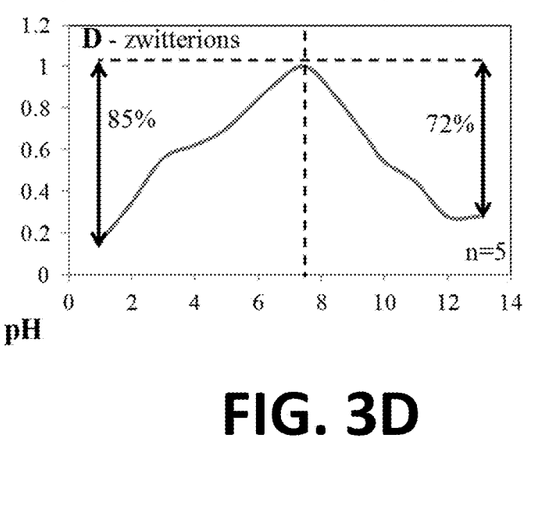

Referring now to FIG. 3A-FIG. 3D where modeling of relative fraction of IOCs associated with the solids content of MSS as a function of pH is graphically illustrated. FIG. 3A shows sorption to solids in MSS of IOCs (featuring $pK_a$ values between 3 and 10) detected previously by the ASU team in U.S. MSS. Additional panels show sorption characteristics of individual classes of MSS constituents: basic (FIG. 3B), acidic (FIG. 3C) and zwitterionic (FIG. 3D) compounds detected in MSS, where 'n' represents the number of contaminants in each class. Dotted vertical line 401 indicates the typical MSS pH value of 7.5. Percentage values shown are the estimated maximum desorption of IOCs from MSS due to ionization as a function of either increasing or decreasing the pH away from the default of 7.5. (relative to the initial amount sorbed on to the sludge at pH 7.5).

Figure 4:
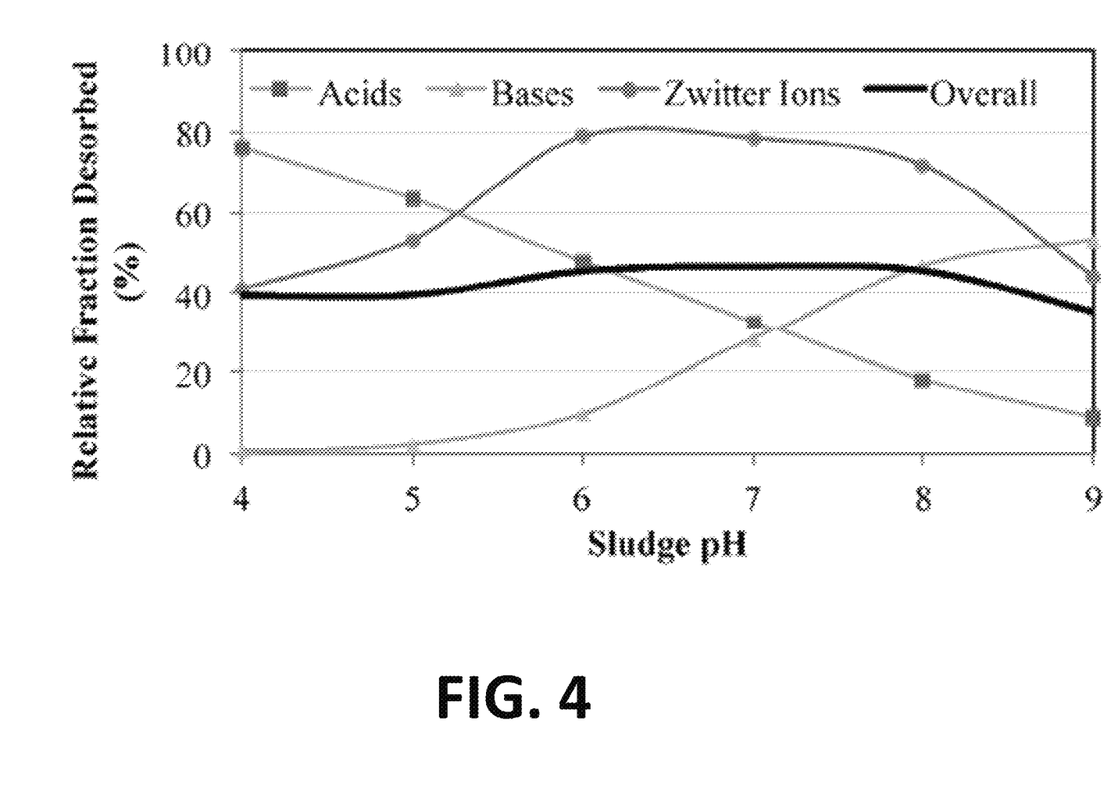
FIG. 4 graphically shows estimated percent desorption of IOCs (n=52) with a combination of acidic (<3) and basic (>12) pH treatment as a function of initial (ambient) sludge pH. E.g., sludge with initial pH between 6 and 8 is ideal to treat and remove >40% of IOCs prior to land-application.

Referring now to FIG. 4, estimated percent desorption of ionizable organic compounds (IOCs) (n=52) with a combination of acidic (<3) and basic (>12) pH treatment as a function of initial (ambient) sludge pH. E.g., sludge with initial pH between 6 and 8 is ideal to treat and remove >40% of IOCs prior to land-application is graphically shown.

The model results show that 12 IOCs feature desorption of >50% with the proposed pH adjustment of MSS: three antibiotics (clarithromycin, enrofloxacin, norfluoxetine), three antihistamines (atorvastatin, amlodipine, diphenhydramine), two analgesics (hydrocodone, oxycodone), one anti-inflammatory (ibuprofen), one antidiabetic (gemfibrozil), one antifungal (thiabendazole) and one diuretic (triamterene). Antihistamines (n=3) were shown to feature maximum desorption of 64% from MSS with the proposed pH adjustment, followed by anti-inflammatory drugs (n=2) and analgesics (n=6) at 51% and 33%, respectively. Many of these contaminants have been shown to occur in runoffs, tile water and groundwater near MSS-applied agricultural lands (Edwards et al., 2009; Gottschall et al., 2012).

Figure 5A:
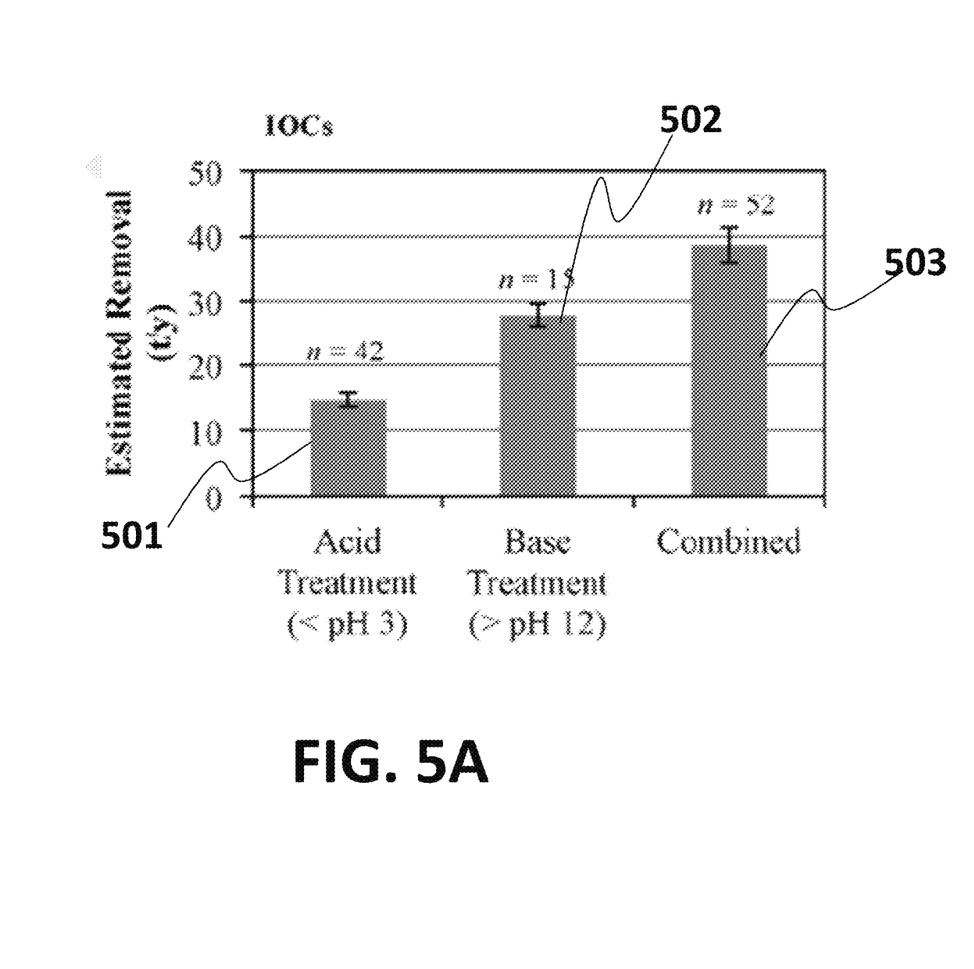
FIG. 5A graphically shows estimated nationwide removal of ionizable organic contaminants from sewage sludge (initial pH of 7.5) by pH treatment. Error bars represent maxima and minima.

Referring now to FIG. 5A, estimated nationwide removal of ionizable organic contaminants from sewage sludge (initial pH of 7.5) by pH treatment. Error bars represent maxima and minima is graphically shown. Bar 501 plots removal with acid treatment having <pH 3, where n=42. Bar 502 plots removal with base treatment having >pH 12 where n=15. Bar 503 plots removal with combined treatments where n=52. The letter n represents the number of ionizable organic compounds (IOCs).

One important limitation of the present model is that it does not account for electrostatic sorption of chemicals. Antibiotics, an important class of contaminants falling into this category, have been detected widely in the environment including in MSS (n=14), even when their sorption coefficients are low (Batt et al., 2006; Kummerer, 2003; McClellan and Halden, 2010). Leaching of antibiotics from soils has been identified as one of the most important pathways for contamination of water bodies (Overcash et al., 2005; ter Laak and Gebbink, 2006; Thiele-Bruhn, 2003). Batch sorption experiments conducted in the laboratory showed that the interaction between antibiotics and soil particles were governed predominantly by solution pH (Hari et al., 2005; ter Laak and Gebbink, 2006). Transport of the antibiotic ciprofloxacin ($pK_{a,1}$=6.2; $pK_{a,2}$=8.8) through a column of porous media was studied at two different solution pH of 5.6 and 9.5 (Chen et al., 2011). The column showed no breakthrough of ciprofloxacin when flushed with a solution of pH 5.6 (lower than its $pK_{a,1}$ value of 6.2). However, at a pH of 9.5 (greater than its $pK_{a,2}$ value of 8.8) ciprofloxacin showed high mobility and about 93% of the compound was observed to desorb from the porous media and left the column after flushing with four pore volumes of deionized water (Chen et al., 2011). Interestingly the present sorption model estimated only 7% desorption rate for ciprofloxacin from MSS after acidic (<3) and basic (>12) pH treatment. This huge difference (92%) between the model and experimental data is due to the exclusion of electrostatic attraction of ciprofloxacin in the present model and hence underestimating the sorption capability of the compound. One of the major concerns with regards to environmental presence of antibiotics is the promotion of antibiotic resistance genes in microorganisms (Pruden, 2013; World Health Organization, 2010). Electrostatic attraction has also been observed for PFCs. It has been shown that the sorption of ionized PFCs is due to electrostatic attraction with the sorbent (Johnson et al., 2007; Wang and Shih, 2011). The pH dependence of the sorption characteristics of perfluorooctane sulfonate (PFOS) and perfluorooctanoate (PFOA), have been studied in the past. These PFCs having very low $pK_a$ values (<0.52) and high solubility in water have been detected in MSS at parts-per-billion levels. Sorption of PFOS to five different materials (goethite, kaolinite, Ottawa sand, iron oxide-coated sands, and sediment from Lake Michigan) showed notable decreases at increased pH, suggesting electrostatic interactions as a prominent parameter governing PFOS partitioning and mobility (Johnson et al., 2007). A similar observation of reduced sorption of PFOA and PFOS to alumina was made as a function of increased pH and ionic strength (Wang and Shih, 2011). There are several other compounds in sludge that may behave similarly to antibiotics and PFCs, and hence are not captured by the model. This suggests that the desorption estimates from the model are very likely to be less than the true value, that may result in an overall higher removal of contaminants from MSS via pH treatment.

An important additional benefit of pH adjustment is a decrease in the pathogen content of MSS due to acidic or basic stabilization. A combination of acidic followed by basic treatment will produce a high amount of heat from the exothermic reaction or heat of hydration, thus facilitating thermal inactivation of pathogens (Fergen, 1995). In addition to organic compounds, it has been shown that metal mobility also depends on several factors including pH, organic matter content, type of sludge and soil, cation-exchange capacity, etc. Heavy metal mobility in sludge-amended soils at different pH levels has been studied in the past (Nikolaidis and Chheda, 2001; Tackett et al., 1986). It was reported that heavy metals, including Cr, Cu, Pb, Ni, Zn and Cd, featured increased mobility and leaching from MSS as a function of decreased pH. Additionally, batch experiments showed removal of heavy metals when contaminated MSS was treated with 20% (v/v) of sulfuric acid, with removal rates of 74% for Ni, 99% for total Cr, 86% for Cu, 11% for Pb and 72% for Zn (Stylianou et al., 2007). Both metals and pathogens are currently regulated in MSS by the U.S. EPA and thus the proposed pH treatment has the potential to further reduce the burden of toxic metals and pathogens in sludge to produce MSS of enhanced quality.

Figure 6:
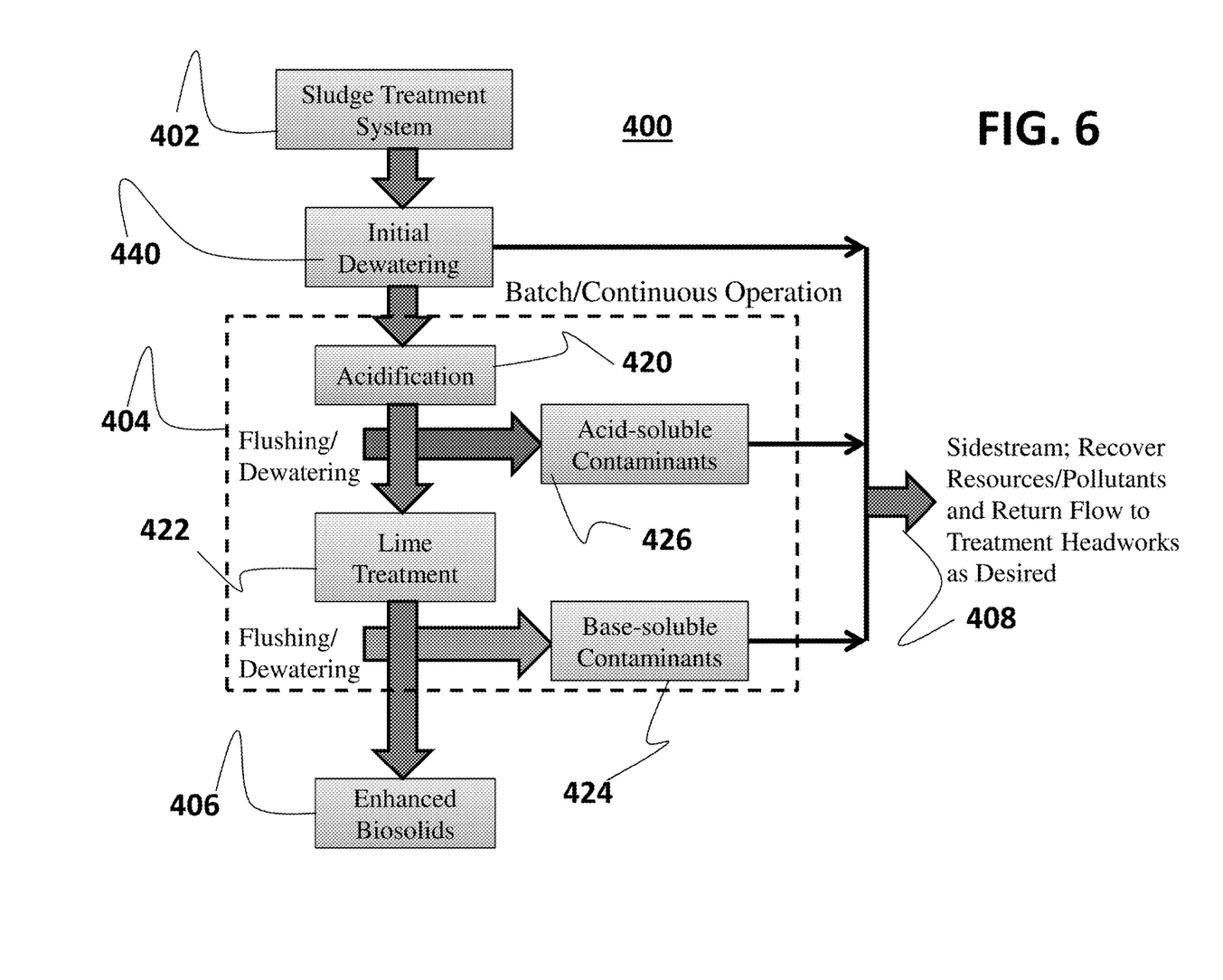
FIG. 6 illustrates a schematic of a pH treatment implemented in a full-scale wastewater sludge treatment system.

The proposed pH treatment system could be implemented in WWTPs after the initial dewatering step of sludge processing (e.g. anaerobic or aerobic digestion process) (FIG. 6). The total concentration of the 52 modeled IOCs in nationally representative MSS samples was 30 mg/kg dw. This concentration translates to 195 t of IOCs in U.S. MSS annually. The model estimates a removal of 40±16 t annually from U.S. MSS; i.e., between 12 and 29% of the selected IOCs could be potentially desorbed and extracted via pH treatment. However, this range is conservative (i.e., lower than the true value) as indicated above due to the exclusion in the model of electrostatic sorption of chemicals and other contaminants with $pK_a$ outside the range of 3 to 10. A prior study that performed Toxicity Leaching Characteristic Procedure (TCLP) showed that an average 2% of NP and NPEOs leached from sewage sludge (La Guardia et al., 2001). Using this value on the national baseline level of NP in U.S. MSS suggests about 69 t/y of NP and NPEOs could leach from land-applied MSS; a fraction of which could be prevented via the proposed pH treatment. In addition, pH treatment could aid in the removal of toxic and regulated metals (Babel and del Mundo Dacera, 2006; Yoshizaki and Tomida, 2000). Using the percentage removal of seven regulated metals (As, Cd, Cu, Pb, Hg, Ni, Zn) reported in the literature, it was estimated that about 1 g per kg of dry sludge or 7000±2300 t annually could be mobilized and removed from U.S. MSS via pH treatment.

Figure 5B:
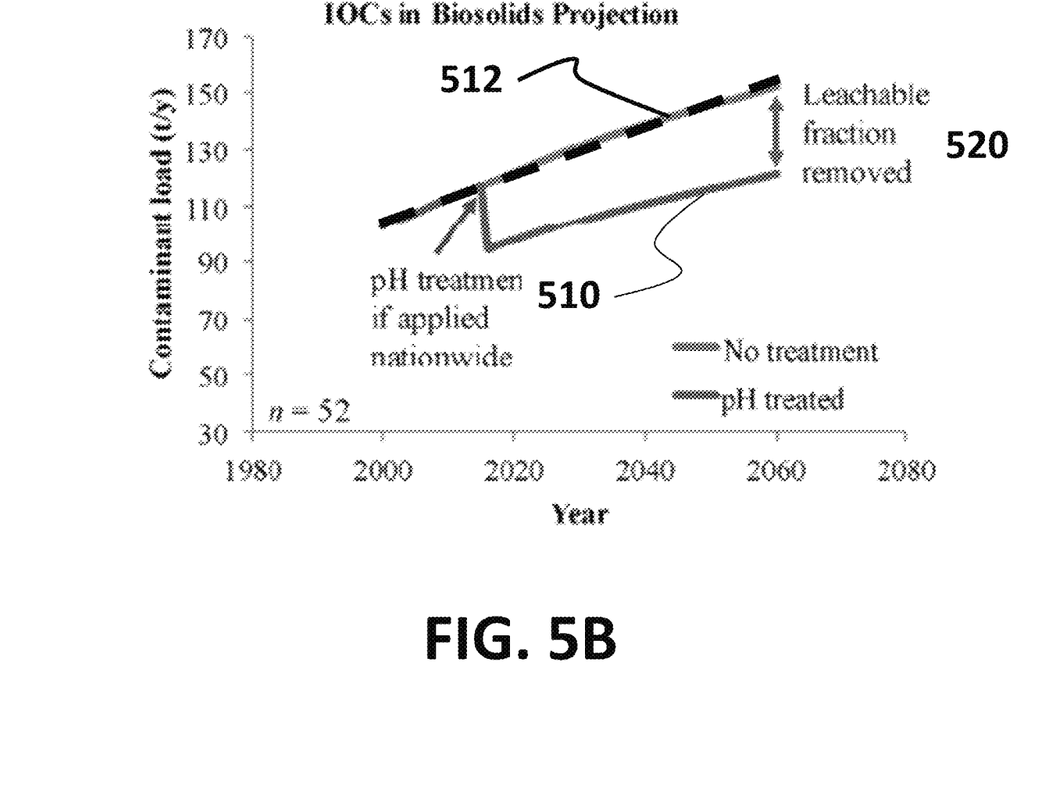
FIG. 5B shows projection of IOCs removed nationwide from land-applied MSS via proposed pH treatment. 'n' represents the number of chemicals modeled.

A comparison of PPCPs data between the 2001 and 2007 national sewage sludge survey revealed that the concentrations of contaminants remained fairly constant over five years (McClellan and Halden, 2010). Hence, assuming similar concentration trends of the selected IOCs in MSS in the future and considering a per capita MSS production of 22.5 kg/per person/year estimated for the year 2007, the removal of contaminants via pH treatment was extrapolated to the year 2060 based on population projections from the U.S. Census Bureau (as shown in FIG. 5B). Projections shows up to 30 t of leachable IOCs can potentially be avoided from land-applied MSS via the proposed pH treatment. The estimated removal of IOCs provided above assumes a single extraction or flushing event of pH-treated MSS to remove contaminants. The removal can be further enhanced through sequential extraction of MSS.

Referring now to FIG. 5B, projection of IOCs removed nationwide from land-applied MSS via proposed pH treatment. 'n' represents the number of chemicals modeled. Curve 510 indicates a projection in IOC's in biosolids if pH treatment is applied. Curve 512 indicates a projection in IOC's in biosolids if pH treatment is not applied. The double-headed arrow 520 indicates the difference as the amount of leachable fraction removed.

Wastewater Sludge Treatment System

Referring now to FIG. 6, a flow schematic of a pH treatment implemented in a full-scale wastewater sludge treatment system is illustrated. A wastewater sludge treatment system 400 includes a sludge treatment system 402 fluidly connected to a storage tank for holding enhanced biosolids 406 and a sidestream flow 408. The sludge treatment system 402 may comprise a digestion tank holding wastewater sludge in suspension, for example. The reactor 404 further comprises an acidification stage 420 and a lime treatment stage 422 both fluidly coupled to the sidestream flow 408.

In operation a volume of treated wastewater sludge from the sludge treatment system 402 undergoes an initial dewatering in stage 440 before being delivered to the reactor 404. After the initial dewatering the dewatered product may be transported to the acidification stage 420 followed by the lime treatment stage 422. In the acid treatment stage 420, extraction agent is added to the product to remove acid-soluble contaminants. The acid-soluble contaminants are removed either by flushing out the contaminants from the product using a flushing agent (e.g., treated wastewater) at stage 426 or by dewatering of the sludge to remove acid soluble concentrated contaminants and resources 426. The concentrated process streams 426 and 424 can be reacted for heat generation derived from the thermal energy of neutralization. The combined process flows 426 and 424 can be processed and used for chemical resource recovery prior to disposal of the liquid stream 408 or its return to the headworks of the treatment operation. Lime treatment is applied at stage 422 to remove base-soluble contaminants which are also either flushed out of the product at stage 424 into the combined flow 408, or reacted for energy and value recovery, such as neutralization as described above. Metals and other resources contained in sludge are known to be of significant monetary and resource value (Westerhoff et al., 2015). Beyond the removal of undesirable contaminants of sludge prior to utilization, there is an opportunity to recover latent heat and elemental, molecular, and biological resources. The reactor process described above may be repeated through multiple cycles to increase the efficiency of pollutant and resource depletion of sludge. After flushing/dewatering, the product is then transported to a tank for storage or directly enters utilization 406.

Examples of flushing agents include treated wastewater, treated effluent, drinking water, tap water, solvents, combinations thereof and the like. Dewatering may be accomplished using a belt press, centrifuge or equivalents. Acidification materials are taken from the group of organic acids, including citric acid and oxalic acid, and from the group of inorganic acids, including sulfuric, nitric and hydrochloric acid, as well as combinations of these.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by different equipment, and devices, and that various modifications, both as to the equipment details and operating procedures, may be accomplished without departing from the true spirit and scope of the present invention.

REFERENCES

The teachings of the following publications are incorporated herein in their entirety by this reference.

Babel S, delMundo Dacera D (2006) Heavy metal removal fromcontaminated sludge for land application: a review. Waste Manag. 26, 988-1004.

Batt A L, Bruce I B, Aga D S (2006) Evaluating the vulnerability of surface waters to antibiotic contamination from varying wastewater treatment plant discharges. Environ Pollut 142:295-302.

Chaney R L, Ryan J A, O'Connor G A (1996) Organic contaminants in municipal biosolids: risk assessment, quantitative pathways analysis, and current research priorities. Sci Total Environ 185:187-216.

Chen H, Gao B, Li H, Ma L Q (2011) Effects of pH and ionic strength on sulfamethoxazole and ciprofloxacin transport in saturated porous media. J Contam Hydrol 126:29-36.

Clarke B O, Smith S R (2011) Review of 'emerging' organic contaminants in biosolids and assessment of international research priorities for the agricultural use of biosolids. Environ Int 37:226-247.

Code of Federal Regulations, 1995. Code of Federal Regulations 40: Part 136, Appendix B, U.S. GPO, Washington, D.C.

Dowd S E, Gerba C P, Pepper I L, Pillai S D (2000) Bioaerosol transport modeling and risk assessment in relation to biosolid placement. J Environ Qual 29:343-348.

Edwards M, Topp E, Metcalfe C, Li H, Gottschall N, Bolton P, Curnoe W, Payne M, Beck A, Kleywegt S (2009) Pharmaceutical and personal care products in tile drainage following surface spreading and injection of dewatered municipal biosolids to an agricultural field. Sci Total Environ 407:4220-4230.

Fergen, R. E. (1995). *Method of treating wastewater biosolids*. U.S. Pat. No. 5,385,673.

Fjeld R A, Eisenberg N A, Compton K L (2007) Quantitative environmental risk analysis for human health. John Wiley & Sons.

Gerba C, Pepper I, Whitehead L (2002) A risk assessment of emerging pathogens of concern in the land application of biosolids. Water Sci Technol 46:225-230.

Gottschall N, Topp E, Metcalfe C, Edwards M, Payne M, Kleywegt S, et al., (2012) Pharmaceutical and personal care products in groundwater, subsurface drainage, soil, and wheat grain, following a high single application of municipal biosolids to a field. Chemosphere 87, 194-203.

Hari A C, Paruchuri R A, Sabatini D A, Kibbey T C (2005) Effects of pH and cationic and nonionic surfactants on the adsorption of pharmaceuticals to a natural aquifer material. Environ Sci Technol 39:2592-2598.

Johnson R L, Anschutz A J, Smolen J M, Simcik M F, Penn R L (2007) The adsorption of perfluorooctane sulfonate onto sand, clay, and iron oxide surfaces. Journal of Chemical & Engineering Data 52:1165-1170.

Kummerer K (2003) Significance of antibiotics in the environment. J Antimicrob Chemother 52:5-7.

La Guardia M J, Hale R C, Harvey E, Mainor T M (2001) Alkylphenol ethoxylate degradation products in land-applied sewage sludge (biosolids). Environ Sci Technol 35:4798-4804.

Lapworth D, Baran N, Stuart M, Ward R (2012) Emerging organic contaminants in groundwater: a review of sources, fate and occurrence. Environmental pollution 163:287-303.

Lindstrom A B, Strynar M J, Delinsky A D, Nakayama S F, McMillan L, Libelo E L, Neill M, Thomas L (2011) Application of WWTP Biosolids and Resulting Perfluorinated Compound Contamination of Surface and Well Water in Decatur, Ala., USA. Environ Sci Technol 45(19): 8015-8021.

Lundin M, Olofsson M, Pettersson G, Zetterlund H (2004) Environmental and economic assessment of sewage sludge handling options. Resour Conserv Recycling 41:255-278.

Martins da Costa P, Vaz-Pires P, Bernardo F (2006) Antimicrobial resistance in *Enterococcus* spp. isolated in inflow, effluent and sludge from municipal sewage water treatment plants. Water Res 40:1735-1740.

McClellan K, Halden R U (2010) Pharmaceuticals and personal care products in archived US biosolids from the 2001 EPA national sewage sludge survey. Water Res 44:658-668.

National Research Council (US). Committee on Toxicants, Pathogens in Biosolids Applied to Land (2002) Biosolids applied to land: Advancing standards and practices. Natl Academy Pr., water.epa.gov Accessed In: 2014.

Nikolaidis N P, Chheda P (2001) Heavy metal mobility in biosolids-amended glaciated soils. Water Environ Res 73:80-86.

North East Biosolids and Residuals Association (NEBRA) (2007) A national biosolids regulation, quality, end use & disposal survey. Tamworth, N.H., nebiosolids.org/uploads/pdf/NtlBiosolidsReport_20July07.pdf, Accessed In: 2014.

O'Kelly B C (2005) Mechanical properties of dewatered sewage sludge. Waste Manage 25:47-52.

Overcash M, Sims R C, Sims J L, Nieman J K C (2005) Beneficial Reuse and Sustainability. J Environ Qual 34:29-41.

Pruden A (2013) Balancing water sustainability and public health goals in the face of growing concerns about antibiotic resistance. Environ Sci Technol 48:5-14.

Reinthaler F, Posch J, Feierl G, Wüst G, Haas D, Ruckenbauer G, Mascher F, Marth E (2003) Antibiotic resistance of *E. coli* in sewage and sludge. Water Res 37:1685-1690.

Rulkens W (2007) Sewage sludge as a biomass resource for the production of energy: overview and assessment of the various options†. Energy Fuels 22:9-15.

Sepulvado J G, Blaine A C, Hundal L S, Higgins C P (2011) Occurrence and fate of perfluorochemicals in soil following the land application of municipal biosolids. Environ Sci Technol 45(19):8106-8112.

Smith S R (1995) Agricultural recycling of sewage sludge and the environment. CAB international.

Stylianou M A, Kollia D, Haralambous K, Inglezakis V J, Moustakas K G, Loizidou M D (2007) Effect of acid treatment on the removal of heavy metals from sewage sludge. Desalination 215:73-81.

Suh Y, Rousseaux P (2002) An LCA of alternative wastewater sludge treatment scenarios. Resour Conserv Recycling 35:191-200.

Tackett S L, Winters E R, Puz M J (1986) Leaching of heavy metals from composted sewage sludge as a function of pH. Can J Soil Sci 66:763-765.

ter Laak T L, Gebbink W A (2006) Estimation of soil sorption coefficients of veterinary pharmaceuticals from soil properties. Environ toxicol chem 25:933-941.

Thiele-Bruhn S (2003) Pharmaceutical antibiotic compounds in soils—a review. Journal of Plant Nutrition and Soil Science 166:145-167.

Topp E, Monteiro S C, Beck A, Coelho B B, Boxall A, Duenk P W, Kleywegt S, Lapen D R, Payne M, Sabourin L (2008) Runoff of pharmaceuticals and personal care products following application of biosolids to an agricultural field. Sci Total Environ 396:52-59.

U.S. Environmental Protection Agency (1979) Process Design Manual for Sludge Treatment and Disposal. yosemite.epa.gov/water/owrccatalog.nsf/ 9da204a4b4406ef885256ae0007a79c7/ 473dfe35407b6aa5 85256b06007248af!OpenDocument. Accessed In: 2014.

U.S. Environmental Protection Agency (January 2009) Targeted National Sewage Sludge Survey Overview Report. water.epa.gov/scitech/wastetech/biosolids/tnsss-overview.cfm. Accessed In: 2014.

Venkatesan A K, Pycke B F G, Barber L B, Lee K E, Halden R U (2012) Occurrence of triclosan, triclocarban, and its lesser chlorinated congeners in Minnesota freshwater sediments collected near wastewater treatment plants. J Hazard Mater 229:29-35.

Venkatesan A K, Done H Y, Halden R U (2015) United States National Sewage Sludge Repository at Arizona State University—a new resource and research tool for environmental scientists, engineers, and epidemiologists. Environmental Science and Pollution Research: 22, 1577-1586.

Venkatesan A K, Halden R U (2014a) Wastewater Treatment Plants as Chemical Observatories to Forecast Ecological and Human Health Risks of Manmade Chemicals. Scientific Reports 4.

Venkatesan A K, Halden R U (2014b) Loss and in situ production of perfluoroalkyl chemicals in outdoor biosolids—soil mesocosms. Environ Res 132:321-327.

Venkatesan A K, Halden R U (2014c) Contribution of Polybrominated Dibenzo-p-dioxins and Dibenzofurans (PBDD/Fs) to the Toxic Equivalency of Dioxin-like Compounds in Archived Biosolids from the US EPA's 2001 National Sewage Sludge Survey. Environ Sci Technol 48(18):10843-10849.

Venkatesan A K, Halden R U (2016) Modeling the pH-mediated extraction of ionizable organic contaminants to improve the quality of municipal sewage sludge destined for land application. Sci Total Environ 550: 736-741.

Wang F, Shih K (2011) Adsorption of perfluorooctanesulfonate (PFOS) and perfluorooctanoate (PFOA) on alumina: Influence of solution pH and cations. Water Res 45:2925-2930.

Wang H, Brown S L, Magesan G N, Slade A H, Quintern M, Clinton P W, Payn T W (2008) Technological options for the management of biosolids. Environmental Science and Pollution Research-International 15:308-317.

Westerhoff P, Lee S, Yang Y, Gordon G, Hristovski K, Halden R U, Herckes P. Examination of opportunities for metals prospecting in municipal biosolids by analysis of samples from full scale wastewater treatment plants. In Review.

World Health Organization (2010) Multidrug and extensively drug-resistant TB (M/XDR-TB): 2010 global report on surveillance and response. whglibdoc.who.int/publications/2010/9789241599191_eng.pdf, Accessed In: 2014.

Wu C, Spongberg A L, Witter J D, Fang M, Czajkowski K P (2010) Uptake of pharmaceutical and personal care products by soybean plants from soils applied with biosolids and irrigated with contaminated water. Environ Sci Technol 44:6157-6161.

Xia K, Hundal L S, Kumar K, Armbrust K, Cox A E, Granato T C (2010) Triclocarban, triclosan, polybrominated diphenyl ethers, and 4-nonylphenol in biosolids and in soil receiving 33-year biosolids application. Environmental Toxicology and Chemistry 29:597-605.

Yoshizaki S, Tomida T (2000) Principle and process of heavy metal removal from sewage sludge. Environ. Sci. Technol. 34, 1572-1575.

What is claimed is:

1. A method for removing leachable resources and organic toxic pollutants from sludge, the method consisting of:
    dewatering a volume of sludge to produce a volume of dewatered sludge;
    adding acidic pH adjusting agent to said volume of dewatered sludge to lower the pH of the said volume of dewatered sludge by at least 4 units below neutral (pH 7) to mobilize the acid-soluble contaminants;
    flushing and dewatering the mobilized acid-soluble contaminants;
    adding a basic pH adjusting agent to said volume of dewatered sludge to raise the pH of the said volume of dewatered sludge by at least 5 units above neutral (pH 7) to mobilize the base-soluble contaminants; and
    flushing out the mobilized base-soluble contaminants via dewatering.

2. The method of claim 1 wherein adding a basic pH adjusting agent comprises adding lime to the volume of dewatered sludge.

3. The method of claim 1 wherein adding pH adjusting agents to the volume of dewatered sludge to remove acid-soluble or base-soluble contaminants further comprises adding pH adjusting agents that remove contaminants selected from the group consisting of pharmaceuticals and personal care products (PPCPs), brominated organics such as brominated flame retardants (BFRs) and polybrominated dioxins and furans (PBDD/Fs), chlorinated organics such as dichlorodiphenyl trimethylethane (DDT) and polychlorinated dioxins and furans (PCDD/Fs), fluorinated organics such as perfluorinated chemicals (PFCs), iodinated organics such as triiodothyronine, and other naturally occurring or anthropogenic compounds such as 4-nonylphenol and its ethoxylates (NP and NPEOs), hormones, nitrosamines, and combinations thereof, and ionizable organic contaminants (IOCs): acids, bases, zwitterions and combinations thereof.

4. The method of claim 1 wherein dewatering comprises using a belt press, a centrifuge or combinations thereof.

5. A method for recovery of chemical resources from sludge, the method consisting of:
    dewatering a volume of sludge to produce a volume of dewatered sludge;
    adding acidic pH adjusting agent to said volume of dewatered sludge to lower the pH of the said volume of dewatered sludge by at least 4 units below neutral (pH 7) to mobilize the acid-soluble contaminants;
    flushing the mobilized acid-soluble contaminants, via sludge dewatering;
    adding a basic pH adjusting agent to said volume of dewatered sludge to raise the pH of the said volume of dewatered sludge by at least 5 units above neutral (pH 7) to mobilize the base-soluble contaminants;
    flushing and dewatering the mobilized base-soluble contaminants; and
    recovering resources from the flushed and dewatered mobilized acid-soluble contaminants and flushed and dewatered mobilized based-soluble contaminants, wherein the recovered resources consist of metals, ionizable organic components and combinations thereof.

* * * * *